(12) United States Patent
Putnam et al.

(10) Patent No.: US 6,310,990 B1
(45) Date of Patent: Oct. 30, 2001

(54) TUNABLE OPTICAL STRUCTURE FEATURING FEEDBACK CONTROL

(75) Inventors: Martin A. Putnam, Cheshire; Robert N. Brucato, Waterbury; Michael A. Davis, Glastonbury; David G. Bellemore, Trumbull; Walter A. Helm, Farmington, all of CT (US)

(73) Assignee: CiDRA Corporation, Wallingford, CT (US)

( * ) Notice: Subject to any disclaimer, the term of this patent is extended or adjusted under 35 U.S.C. 154(b) by 0 days.

(21) Appl. No.: 09/519,802

(22) Filed: Mar. 6, 2000

(51) Int. Cl.[7] .................................................. G02B 6/00
(52) U.S. Cl. .......................................................... 385/12
(58) Field of Search ................................... 385/10–12, 37; 250/231.18, 237 G, 306; 73/105; 356/613, 614

(56) References Cited

U.S. PATENT DOCUMENTS

| | | |
|---|---|---|
| 5,026,137 | 6/1991 | Tokumitsu . |
| 5,042,898 | 8/1991 | Morey et al. . |
| 5,107,360 | 4/1992 | Huber . |
| 5,115,338 | 5/1992 | DiGiovanni et al. . |
| 5,119,447 | 6/1992 | Trisno . |
| 5,134,620 | 7/1992 | Huber . |
| 5,140,456 | 8/1992 | Huber . |
| 5,151,908 | 9/1992 | Huber . |
| 5,153,762 | 10/1992 | Huber . |
| 5,166,821 | 11/1992 | Huber . |
| 5,187,760 | 2/1993 | Huber . |
| 5,191,586 | 3/1993 | Huber . |
| 5,200,964 | 4/1993 | Huber . |
| 5,208,819 | 5/1993 | Huber . |
| 5,210,631 | 5/1993 | Huber et al. . |
| 5,210,633 | 5/1993 | Trisno . |
| 5,222,089 | 6/1993 | Huber . |
| 5,231,529 | 7/1993 | Kaede . |
| 5,243,609 | 9/1993 | Huber . |
| 5,245,863 | * 9/1993 | Kajimura et al. ..................... 73/105 |

(List continued on next page.)

OTHER PUBLICATIONS

Larry K. Baxter, "Capacitive Sensors Design and Applications", IEEE Press Series on Electronics Technology, pp. 66–82.

T. R. Hicks and P. D. Atherton, "The NanoPositioning Book", Queensgate Instruments Ltd. 1997, pp. 81–103.

CiDRA Corporation, "Applications of Optical Fiber Bragg Grating Sensors for the Seismic Industry", May 1998, pp. 1–12.

Primary Examiner—Akm E. Ullah
(74) Attorney, Agent, or Firm—Ware, Fressola, Van Der Sluys & Adolphson LLP

(57) ABSTRACT

A tunable optical device has a compression tuned optical structure and a displacement sensor. The compression tuned optical structure responds to an optical signal, and further responds to a displacement sensor signal, for providing a compression tuned optical structure signal containing information about a change in an optical characteristic of the compression tuned optical structure, and for also further providing an excitation caused by a change in a displacement of the compression tuned optical structure. The displacement sensor responds to the excitation, for providing a displacement sensor signal containing information about the change in the displacement of the compression tuned optical structure. The compression tuned optical structure may be in the form of a dogbone structure that is an all-glass compression unit having wider end portions separated by a narrower intermediate portion. The displacement sensor includes a capacitance sensor affixed to the compression tuned optical structure for measuring a change in capacitance between two parallel and opposing plates that depends on a change in a gap or an area with respect to the two parallel and opposing plates.

22 Claims, 8 Drawing Sheets

A TUNABLE OPTICAL DEVICE

U.S. PATENT DOCUMENTS

| | | |
|---|---|---|
| 5,257,124 | 10/1993 | Glaab et al. . |
| 5,257,125 | 10/1993 | Maeda . |
| 5,260,823 | 11/1993 | Payne et al. . |
| 5,268,910 | 12/1993 | Huber . |
| 5,271,024 | 12/1993 | Huber . |
| 5,394,741 * | 3/1995 | Kajimura et al. ............... 73/105 |
| 5,469,520 | 11/1995 | Morey et al. . |
| 5,502,781 | 3/1996 | Li et al. . |
| 5,579,143 | 11/1996 | Huber . |
| 5,608,825 | 3/1997 | Ip . |
| 5,691,999 | 11/1997 | Ball et al. . |
| 5,706,375 | 1/1998 | Mihailov et al. . |
| 5,726,785 | 3/1998 | Chawki et al. . |
| 5,748,349 | 5/1998 | Mizrahi . |
| 5,859,941 | 1/1999 | Horita et al. . |
| 5,867,289 | 2/1999 | Gerstel et al. . |
| 5,889,901 * | 3/1999 | Anderson et al. ............... 385/12 |
| 5,896,378 | 4/1999 | Barker . |
| 5,920,413 | 7/1999 | Miyakawa et al. . |
| 5,926,300 | 7/1999 | Miyakawa et al. . |
| 5,953,141 | 9/1999 | Liu et al. . |
| 5,959,749 | 9/1999 | Danagher et al. . |
| 5,960,133 | 9/1999 | Tomlinson . |
| 5,982,518 | 11/1998 | Mizrahi . |
| 5,991,076 | 11/1999 | Cheng . |
| 5,999,290 | 12/1999 | Li . |
| 6,002,503 | 12/1999 | Mizrahi . |
| 6,020,986 | 2/2000 | Ball . |
| 6,087,655 * | 7/2000 | Kobrin ............... 250/231.18 |

\* cited by examiner

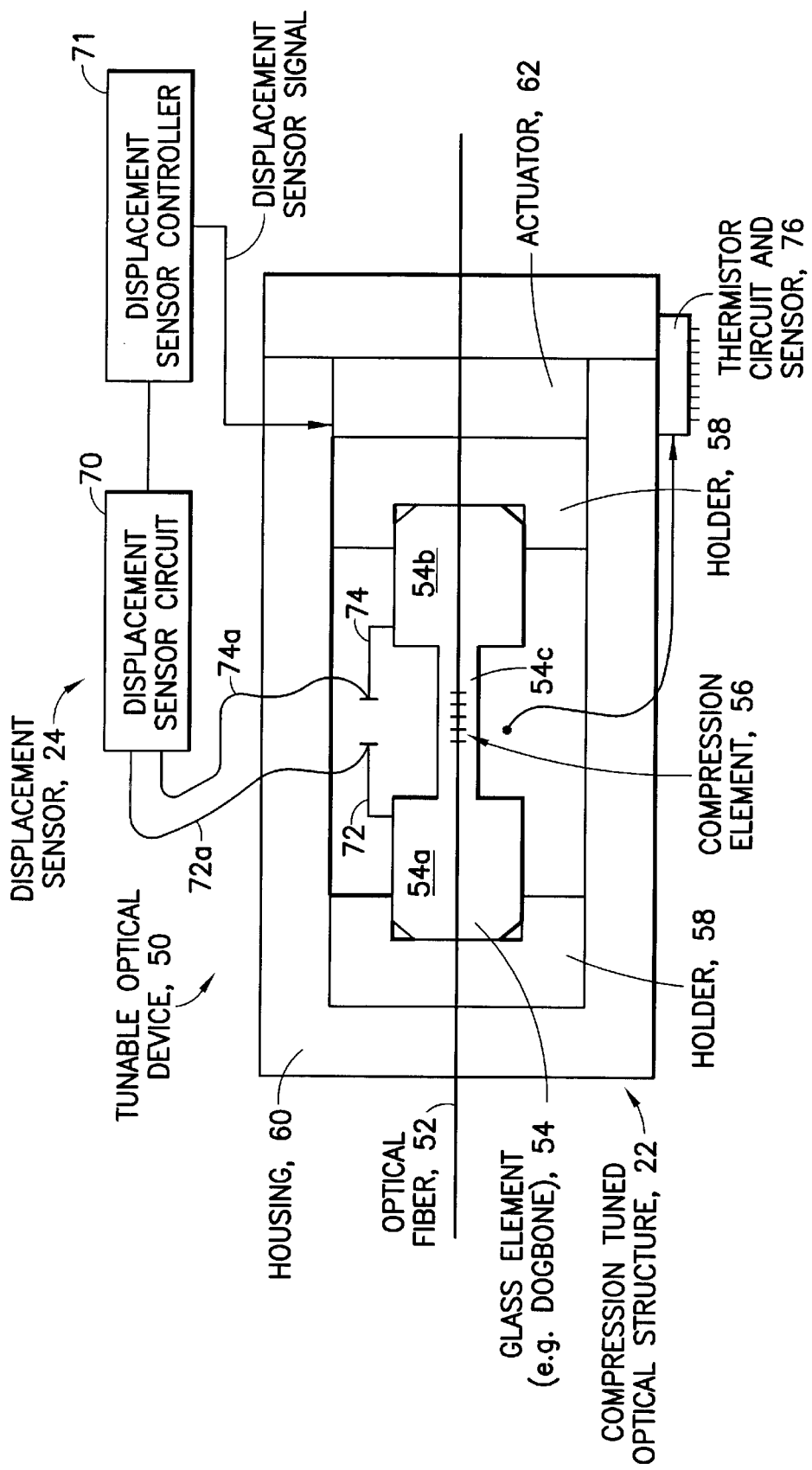
FIG. 2 A TUNABLE OPTICAL DEVICE

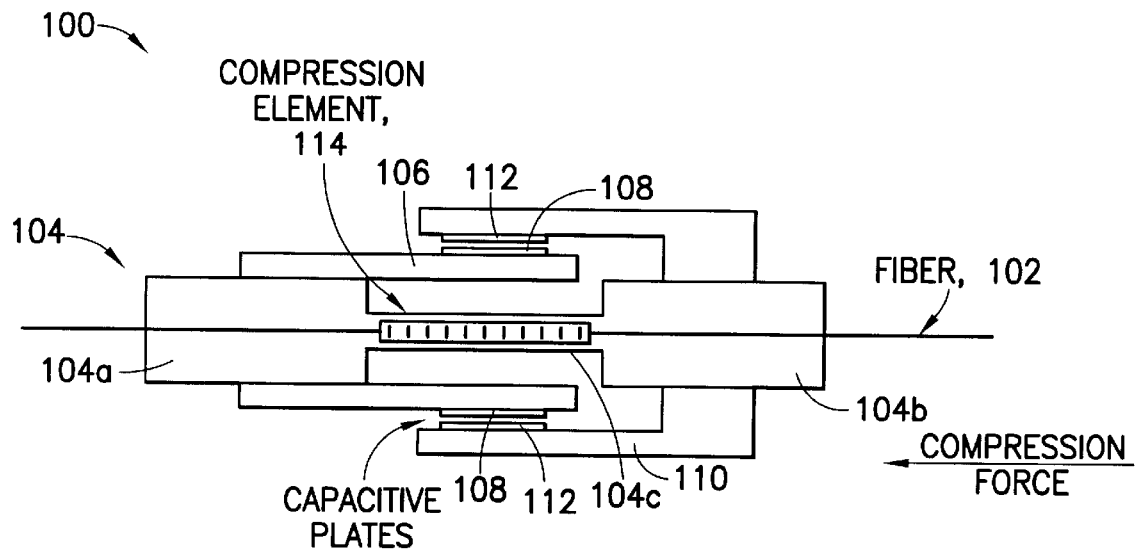
FIG.3 TUBE-IN-TUBE CAPACITANCE SENSOR ARRANGEMENT
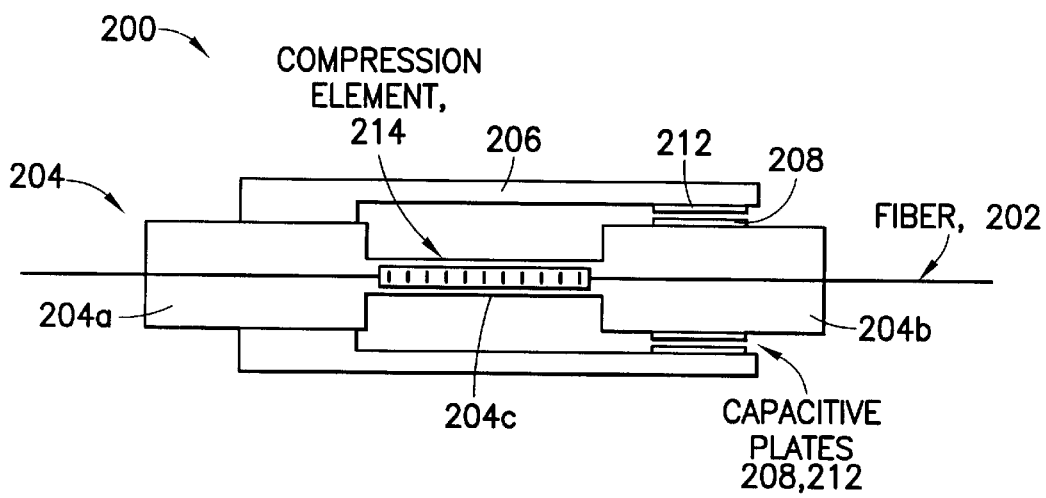
FIG.4 SINGLE TUBE CAPACITANCE SENSOR ARRANGEMENT

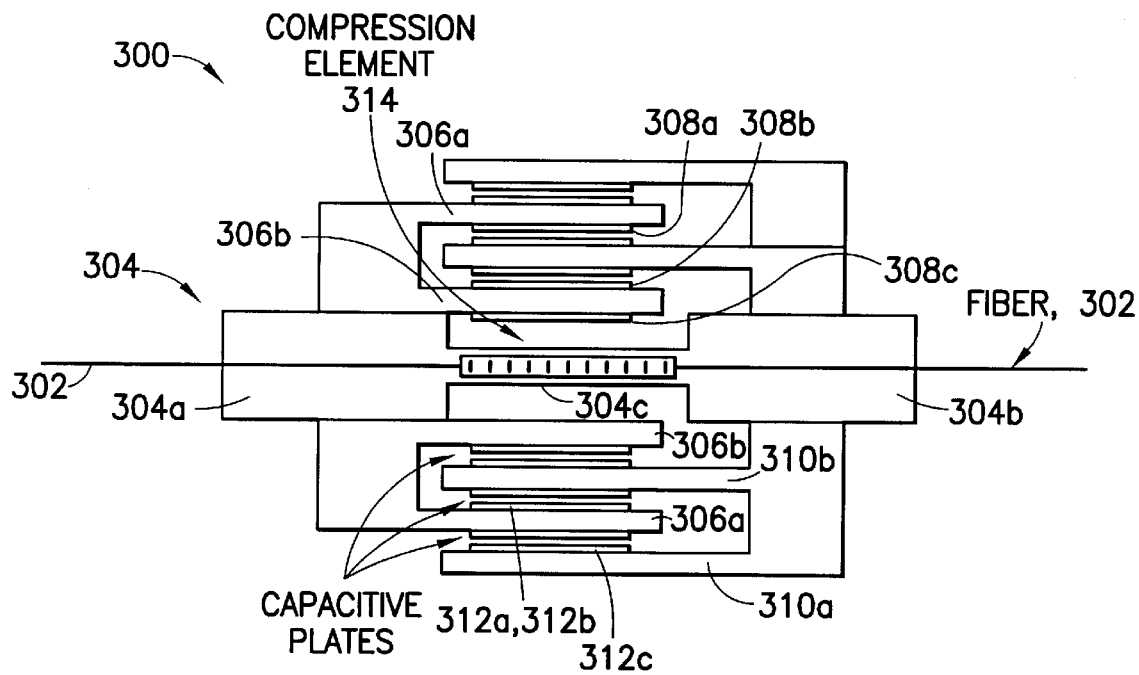
FIG.5 MULTIPLE TUBE-IN-TUBE CAPACITANCE SENSOR ARRANGEMENT
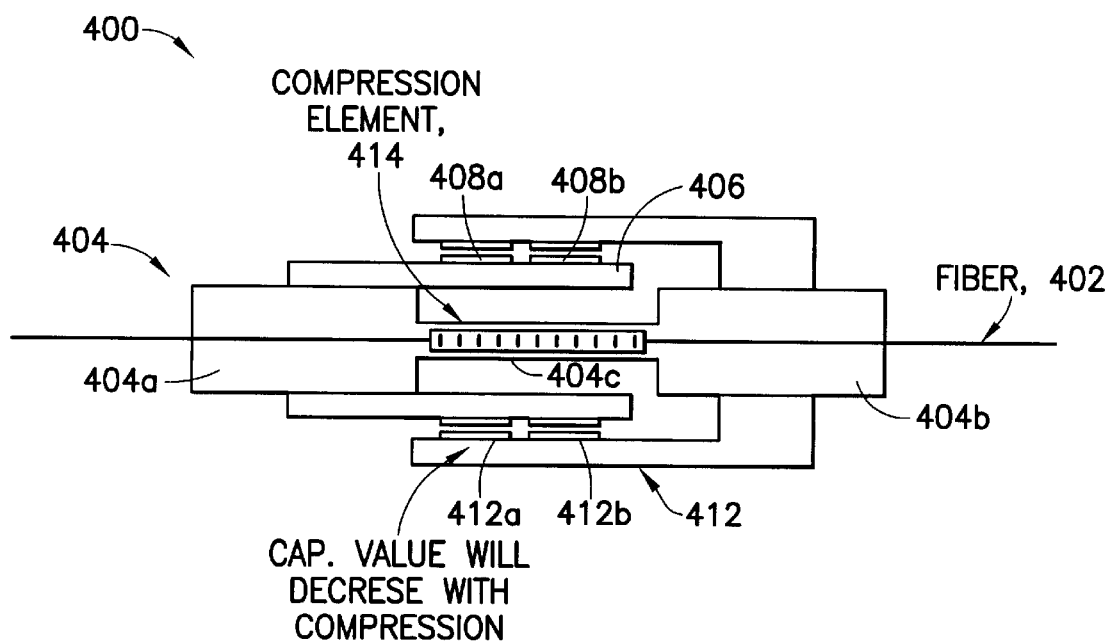
FIG.6 TUBE-IN-TUBE CAPACITANCE DIFFERENTIAL SENSOR ARRANGEMENT

TUNABLE OPTICAL STRUCTURE FEATURING FEEDBACK CONTROL

BACKGROUND OF INVENTION

1. Technical Field

The present invention relates to a compression tuned optical structure; and more particularly, a compression tuned optical structure having force or displacement feedback control.

2. Description of Related Art

There are a host of applications that could exploit the principle of a tunable fiber Bragg grating. These include tunable filters, reconfigurable optical add/drop multiplexers, optical performance monitors, wavelockers, tunable lasers, etc. Each of these applications would benefit from the ability to tune the grating accurately and repeatably and without the need for optical closed loop control, i.e. without needing to measure the wavelength of the grating directly.

In the art, since the wavelength of the Bragg grating is uniquely determined by the strain and the temperature of the grating, in principle, if one could simply measure the strain and the temperature of the grating at all times, then one could always know the wavelength of the grating. In practice, this is accomplished by attaching the grating to an actuator such as a piezoelectric element, then stretching the fiber some determinable amount. If the positional relationship between the actuator and the fiber is maintained, then one can theoretically deduce the Bragg grating wavelength by measuring the displacement of the actuator.

But it is known that if there is some lost motion between the fiber and the actuator, then a measurement of the actuator displacement will result in an erroneous wavelength determination. For example, when strain tuning a coated optical fiber, this effect is almost unavoidable, as the known attachment techniques will involve some sort of epoxy with a limited holding ability. Additionally, tuning the fiber Bragg grating by applying tensile strain is considered to be an unacceptable method from the perspective of fiber reliability, since the lifetime of a fiber can be significantly reduced by continuously stressing it.

Alternatively, another known method encases the Bragg gratings in an all glass element capable of sustaining high compressional loads, which has the potential to be incorporated into a device which can be used to reliably and accurately tune a Bragg grating by strain. The technique was originally applied to pressure transducers and incorporates a glass shell around the device to enable transduction of hydrostatic pressure into compressional strain. The core of the element (the dogbone) can be used in other configurations that allow compressive loads to affect the Bragg wavelength. For example, ends of the glass element can be ground into cone shapes which fit into the cone seats of a body which is mechanically attached to a displacement actuator. This composite glass element Bragg grating has two primary advantages over standard fiber gratings discussed above from the perspective of tunability. The first is that, since the element is placed under compression rather than tension, the device is inherently more reliable. The second is that, because the device can be made of glass with arbitrary dimensions and shapes, the issue of forming a slip-free attachment to an actuator becomes simplified (e.g. glass on metal seats i.e. no epoxy to hold off high forces).

However, if one is concerned with extremely high accuracies, then one cannot ignore the possibility of lost motion or hysteresis even in the glass to metal contact region. For example, over time, the seats may deform slightly, thereby changing the actual displacement of the glass element relative to the actual displacement of the actuator. If the displacement of the actuator rather than the glass element is measured, then there will be an error introduced into the measurement.

SUMMARY OF INVENTION

The present invention provides a tunable optical device having a compression tuned optical structure and a displacement sensor.

The compression tuned optical structure responds to an optical signal, and further responds to a displacement sensor signal, for providing a compression tuned optical structure signal containing information about a change in an optical characteristic of the compression tuned optical structure, and for also further providing an excitation caused by a change in a displacement of the compression tuned optical structure.

The displacement sensor responds to the excitation, for providing the displacement sensor signal containing information about the change in the displacement of the compression tuned optical structure.

The compression tuned optical structure may be in the form of a dogbone structure that is an all-glass compression unit having wider end portions separated by a narrower intermediate portion having a Bragg grating therein.

The displacement sensor includes a capacitance sensor affixed to the compression tuned optical structure for measuring a change in capacitance between two parallel and opposing plates that depends on a change in a gap or an area with respect to the two parallel and opposing plates. The change in the displacement of the compression tuned optical structure causes a change in the gap between the two parallel and opposing plates, and the change in capacitance depends on the change in the gap. Alternatively, the change in the displacement characteristic of the compression tuned optical structure causes a change in an overlapping area between the two parallel and opposing plates, and the change in capacitance depends on the change in the overlapping area.

The capacitance sensor may have two metallic-coated tubes affixed to the compression tuned optical structure so that metallic surfaces face each other with a small gap inbetween. The two parallel and opposing plates may be affixed to parts ending from the wider end portions of the dogbone structure. The small gap may be about 200 micron. The capacitance sensor has electrodes attached to the metallic-coated tubes to allow connection of the capacitor sensor to an electronic device capable of measuring capacitance. Each of the two metallic-coated tubes is affixed to or formed on a respective one of the wider end portions. The narrower intermediate portion may have a Bragg grating or a Fabry-Perot interferometer arranged therein. The Fabry-Perot interferometer may include a pair of fiber Bragg gratings separated by a predetermined distance.

The displacement sensor may also include inductive sensing using two coils affixed to the compression tuned optical structure for measuring a change in inductance between the two coils. Other gap sensing techniques may be used, such an optical, magnetic, microwave, time-of-flight based gap sensors. Moreover, a force applied on or about the compressive element (i.e. grating or Fabry-Perot interferometer gap) may be sensed, and fed back to control the compression tuning of the optical structure.

In effect, this present invention provides a device, which combines a highly accurate means of measuring displacement with a compression tuned optical structure, including a tunable element having a fiber Bragg grating or Fabry-Perot interferometer. This hybrid device will enable a true indirect means of controlling the wavelength of the fiber Bragg grating or Fabry-Perot interferometer without the need for optical closed loop control. The device combines a highly accurate, and potentially drift-free, capacitance or inductance sensor with the tunable grating element. For example, the capacitance sensor measures displacement by taking advantage of the change in capacitance between two parallel, and opposing plates when the gap and/or the area of the plates change. Although attachment methods can be designed to minimize the creep between the actuator and the tunable glass element, in practice it is difficult to fully eliminate it. For this reason, it is highly desirable to incorporate the capacitance sensor directly onto the tunable element to form a monolithic tunable Bragg grating with built-in electronic displacement determination. Incorporating the displacement sensor directly on the glass element allows one to make a direct measurement of the displacement, which directly relates to the strain on the element and, therefore, enables direct and real time knowledge of the Bragg wavelength. There are many possible embodiments of this concept shown and described below. However, one of the simplest would involve fixing two gold-coated tubes over the tunable glass element such that the gold surfaces face each other with a small gap (about 200 micron) between them. Ideally the tubes would be welded to the large diameter section of the dogbone element. However, since there is no force to hold off, they could, in principle, be epoxied in place. Electrodes would be attached to the gold-coated tubes to allow connection of the capacitor to an electronic device capable of measuring capacitance. As the dogbone element is strained, the gap between the parallel plates will change, thereby causing the capacitance to change. Therefore, a measurement of the capacitance will be directly related to the Bragg wavelength, provided the temperature of the element is either held constant or measured. Since the tubes are directly connected to the dogbone, they are completely passive and will not slip.

Consistent with that previously described, the capacitance sensor provides an ideal method for a displacement measurement that can be integrated directly onto the compression tuned fiber Bragg grating element. There are several capacitance sensor configurations discussed below which can be used for this application, each having particular advantages and disadvantages. To optimize the capacitive sensor used in the design, considerations must be made which include the circuit which will be used to measure the capacitance and the ultimate conversion of capacitance to displacement (or force). To maintain consistent resolution and accuracy over the functional range of the capacitive sensor, the change in the area of the capacitor will produce a proportionally equal change in capacitance (as opposed to a plate separation which demonstrates an inversely proportional dependence).

In addition to the potential uses of the hybrid capacitive or inductive sensor and tunable FBG, other devices formed in the compression element would also benefit from the addition of a capacitive displacement sensor. Such examples of these might be a fiber Fabry-Perot pair, Bragg grating pairs, a distributed feedback laser, an interactive Bragg grating laser.

The whole thrust of the present invention is to avoid using optical light transmitted from the compression tuned optical structures to tune the wavelength of the compression element, which increases the light available to the overall system. For example, if n compression tuned optical structures are connected in series, and a respective x % of light is used for each of the n compression tuned optical structures, then approximately nx % of light may be used to tune the overall system, which may significantly reduce the amount of light available to the overall system. In effect, the present invention provides an open-loop control system in relation to optical performance for tuning the compression element.

The foregoing and other objects, features and advantages of the present invention will become more apparent in light of the following detailed description of exemplary embodiments thereof, as illustrated in the accompanying drawing.

BRIEF DESCRIPTION OF THE DRAWING

The drawing includes numerous Figures, and the following is a brief description thereof:

FIG. 2 is a diagram of one embodiment of the tunable optical device shown in FIG. 1.

FIG. 3 is a diagram of a tube-in-tube capacitive sensor arrangement that may be part of the embodiment of the tunable optical device shown in FIG. 1.

FIG. 4 a diagram of a single tube capacitive sensor arrangement that may be part of the embodiment of the tunable optical deice shown in FIG. 1.

FIG. 5 is a diagram of a multiple tube-in-tube capacitive sensor arrangement that may be part of the embodiment of the tunable optical device shown in FIG. 1.

FIG. 6 is a diagram of a tube-in-tube capacitive differential sensor arrangement that may be part of embodiment of the tunable optical device shown in FIG. 1.

DETAILED DESCRIPTION OF THE INVENTION

Figure 1:
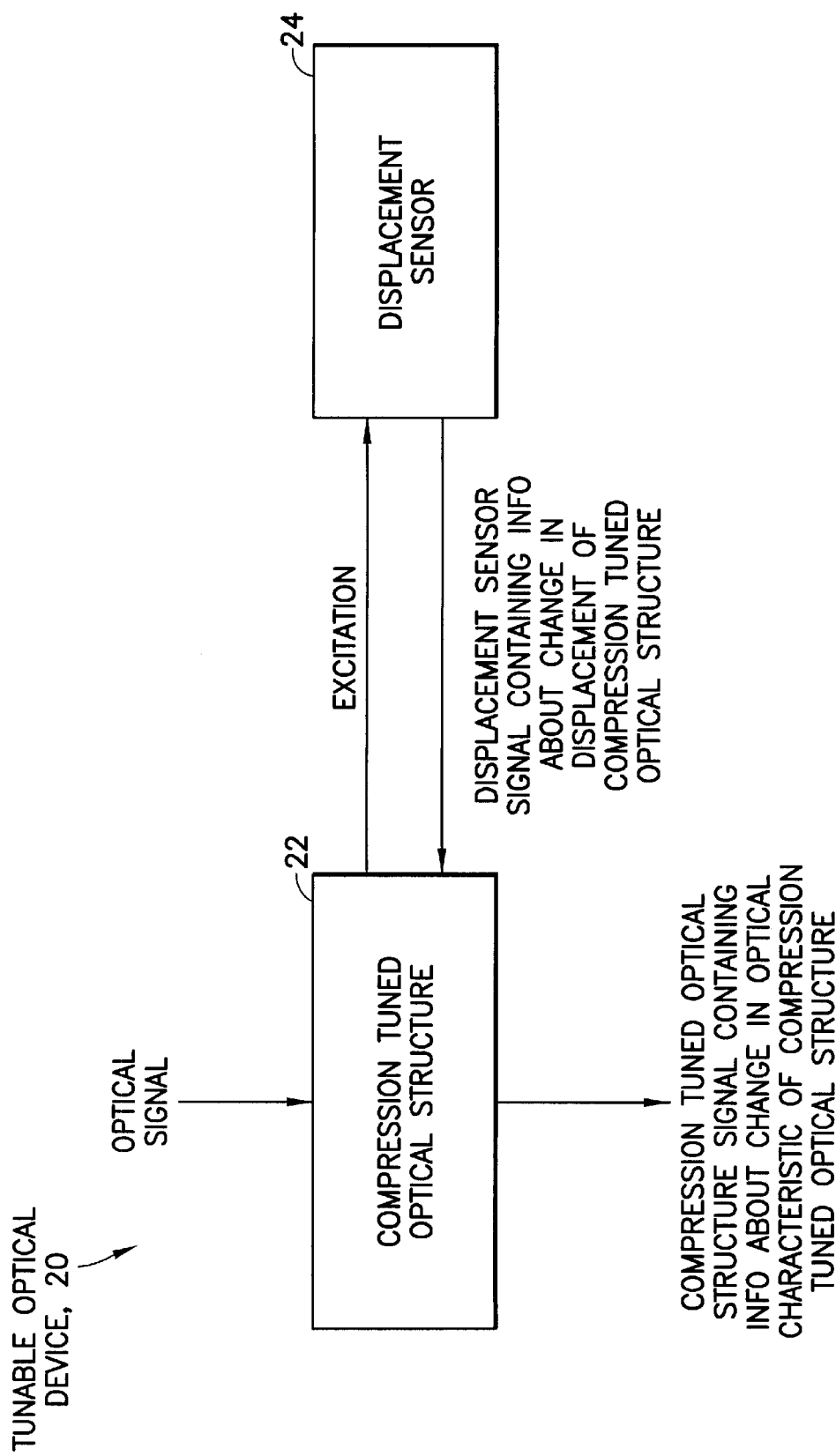
FIG. 1 is a block diagram of a tunable optical device that is the subject matter of the present invention.

FIG. 1: The Basic Invention

FIG. 1 shows a tunable optical device generally indicated as 20 having a compression tuned optical structure 22 and a displacement sensor 24.

The compression tuned optical structure 22 responds to an optical signal, and further responds to a displacement sensor signal, for providing a compression tuned optical structure signal containing information about a change in an optical characteristic of the compression tuned optical structure, and for also further providing an excitation caused by a change in a displacement of the compression tuned optical structure 22.

The displacement sensor 24 responds to the excitation from the compression tuned optical structure 22, for providing the displacement sensor signal containing information about the change in the displacement of the compression tuned optical structure.

The compression tuned optical structure 22 is in the form of a dogbone-shaped structure (hereinafter "dogbone structure"), which is an all-glass compression unit that may be formed by glass collapsing technology shown and described in U.S. patent application Ser. No. 09/455,867 (CiDRA File No. CC 0036B), filed Dec. 6, 1999, as well as U.S. patent application Ser. No. 09/455,865 (CiDRA File No. CC-0078B), filed Dec. 6, 1999, both hereby incorporated by reference in their entirety, as discussed below in more detail. The compression tuned optical structure 22 can also be in the form of a single large diameter waveguide known as a fiber cane, shown and described in U.S. patent application Ser. No. 09/455,868 (CiDRA File No. CC 0230), filed Dec. 6, 1999, as well as patent application Ser. No. 09/456,112 (CiDRA File No. CC 0129B), filed Dec. 6, 1999, both hereby incorporated by reference in their entirety, as discussed below in more detail. The compression tuned optical structure 22 may also include Bragg grating, fiber Bragg grating or Fabry-Perot interferometer based optical structures, as discussed herein. The present invention is shown and described below in relation to many different embodiments of the compression tuned optical structure 22 and the overall dogbone structure.

The displacement sensor 24 may include either capacitive or inductive sensing to measure displacement. Capacitive sensing is shown and described in terms of plates affixed to the compression tuned optical structure 22 separated by a given gap or distance, while inductive sensing is understood to be coils (instead of plates) separated by a given gap or distance.

The scope of the invention is not intended to be limited to any particular application of the tunable optical device 20. For example, applications are envisioned where the tunable optical device 20 is used as an optical sensing device (such as a pressure sensor), as well as an optical signal-generating device (such as laser devices).

FIG. 2: The Tunable Optical Device 22

FIG. 2 shows a tunable optical device generally indicated as 50, having the compression tuned optical structure 22 (see also FIG. 1) and the displacement sensor 24 (see also FIG. 1).

The compression tuned optical structure 22 includes a glass element 54 having a compression element 56 arranged therein, a pair of holders 58 coupled to the glass element 54 and arranged inside a housing 60, and an actuator 62 arranged between one holder 58 and a wall of the housing 60. The actuator 62 may be any type of device that provides a compressive force, including a piezoelectric (PZT) device, a stepper motor, a magnetostrictive device, or any type of pressure-inducing device. The glass element 54 has two wide end portions 54a, 54b and a narrow intermediate portion 54c.

The displacement sensor 24 includes a displacement sensor circuit 70, a displacement sensor controller 71 and capacitive elements 72, 74 connected to the glass element 54 as well as the actuator 62. The capacitive elements 72, 74 are affixed to the wide end portions 54a, 54b of the glass element 54, and move in relation to one another when the wide end portions 54a, 54b are displaced by a compressive force or pressure.

In operation, the glass element 54 responds to an optical signal along the optical fiber 52, and the actuator 62 responds to a displacement sensor signal from the displacement sensor controller 71, for providing a compression tuned optical structure signal along the optical fiber 52 containing information about a change in an optical characteristic of the compression element 56 in the glass element 54, and for also further providing an excitation caused by a change in a displacement of the wide end portions 54a, 54b of the glass element 54 of the compression tuned optical structure 22. The excitation occurs when the actuator 62 compresses the glass element 54.

The capacitive elements 72, 74 of the displacement sensor 24 respond to the excitation (i.e. the movement), which is sensed by the displacement circuit 70 and processed by the displacement sensor controller 71, for providing the displacement sensor signal containing information about the change in the displacement of the wide end portions 54a, 54b of the glass element 54 of the compression tuned optical structure 22. For the purposes of understanding the invention, it is important to note that the capacitive elements 72, 74 are described as a part of the displacement sensor 24 (see also FIG. 1). However, the spirit of invention includes an understanding that the capacitive elements 72, 74 could be described as a part of the compression tuned optical structure 22 (see also FIG. 1), as well. In such a case, the compression tuned optical structure 22 would provide some excitation signal to the displacement sensor 24. The excitation signal can be in the form of a capacitance, inductive, optical, microwave or time-of-flight signal. The scope of the invention is not intended to be limited to any particular type of displacement sensing.

The displacement sensor circuit 70 and the displacement sensor controller may be used to calibrate the operation of the actuator 62. It has been found that the displacement of the glass element 54 may change due to wear and tear over time, changing due to the effects of being maintained under compression and actuated periodically by a compressive force. The displacement sensor circuit 70 and the displacement sensor controller 71 will take changes in displacement into account so that signal for actuating the actuator 62 is modified consistent with the change in the displacement. A person skilled in the art would appreciate, without undue experimentation, how to implement the displacement sensor circuit 70 and the displacement sensor controller 71 after reading the specification in conjunction with that shown in the drawing.

Moreover, the scope of the invention is not intended to be limited to where the calibration processing is performed. The calibration associated with the change of displacement can be perform by the displacement sensor circuit 70, the displacement sensor controller 71, or a controller or some other circuit in the actuator 62.

FIG. 2 also shows a thermistor circuit and sensor 76 for sensing the ambient temperature of the glass element 54 in the proximity of the compressive element 56. The thermistor circuit and sensor 76 is shown and described in relation to an optical structure in U.S. patent application Ser. No. 09/448,367 (CiDRA File No. CC 0218 and WFVA File no. 712-2-76), filed Nov. 23, 1999, hereby incorporated by reference in its entirety.

The Dogbone Structure

As discussed above, the "dogbone" structure 104 is an all-glass fiber Bragg grating compression unit having the fiber Bragg grating (FBG) 114, as shown, or in the form of a distributed feedback (DFB) laser. The dogbone structure 104 may be in the form of a glass tube having the optical fiber 102 fused therein. As shown, the narrower intermediate portion 104c has the fiber Bragg grating 114 arranged therein with gratings spaced along the axis of compression. As shown, the wider end portions 104a, 104b have a larger cross-section than the narrower intermediate portion 104c. The dogbone structure 104 provides for amplification of the compression force applied on one or more of the wider end portions 104a, 104b as applied to the fiber Bragg gratings spaced in the narrower intermediate portion 22c. The amplification by the "dogbone" structure 104 is analogous to Pascal's Principle in fluid dynamics, where an external pressure applied to a fluid confined within a closed container is transmitted undiminished throughout the entire fluid, so pressure is applied as a function of force per unit area in the "dogbone" structure 104.

The dogbone structure 104 can be formed by taking the optical fiber and inserting it into an alignment tube of an inner diameter just larger than that of the outer diameter of the fibers, which is then collapsed on the optical fiber. For example, such glass collapsing technology is shown and described in U.S. patent application Ser. No. 09/455,867 (CiDRA File No. CC 0036B), as well as U.S. patent application Ser. No. 09/455,865 (CiDRA File No. CC 0078B), discussed above. In particular, this glass collapsing technology relates to collapsing a 1 millimeter tube of the optical fiber, then collapsing a 3 millimeter tube onto the 1 millimeter tube. The resulting all-glass tube may be ground to form the "dogbone" shape structure 104. The invention is described in relation to a "dogbone" shaped compression unit; however, the scope of the invention is intended to cover shapes other than a "dogbone" structure, such as a straight tubular cylindrical structure.

The dogbone structure 104 also can be in the form of a single large diameter waveguide having a core with the gratings spaced therein, also known as a fiber cane, shown and described in United States patent application Ser. No. 09/455,868 (CiDRA File No. CC 0230), as well as U.S. patent application Ser. No. 09/456,112 (CiDRA File No. CC 0129B), discussed above.

The structure of the compression-tuned dogbone structure 104 is also shown and described in more detail in patent application Ser. No. 09/456,112 (CiDRA File No. CC 0129), discussed above.

FIG. 3: Tube-in-tube Capacitance Sensor Arrangement

FIG. 3 shows a tube-in-tube capacitance sensor arrangement generally indicated as 100 that may be used in the tunable optical device shown in FIG. 2. The tube-in-tube capacitance sensor arrangement 100 is shown in relation to an optical fiber 102 coupled to a compression tuned glass element 104. The tunable optical device 100 has a "tube-in-tube" design which can be used to measure a displacement of the compression tuned glass element 104 using a capacitive sensor where the effective area changes with displacement.

As shown, the compression tuned glass element 104 has the "dogbone" structure having two wider end portions 104a, 104b separated a narrower intermediate portion 104c. One wider end portion 104a has an inner tube 106 having an inner capacitive plate 108, while another wider end portion 104b has an outer tube 110 having an outer capacitive plate 112. The narrower intermediate portion 104c has a compression element 114 in the form of a fiber Bragg grating. The compression element 114 may also be in the form of a Fabry-Perot interferometer having two Bragg gratings separated by a predetermined distance. In one embodiment, the capacitive plates 108, 112 have a metallic coating, such as gold. The change in the displacement of the glass element 104 causes a change in the gap between the two capacitive plates 108, 112, and the change in capacitance depends on the change in the overlapping area.

As shown, the two gold-coated tubes 106, 110 are affixed over the glass element 104 such that the gold surfaces face each other with a small gap (about 200 micron) between them. Ideally, the tubes 106, 110 would be welded to the large diameter section of the dogbone element. However, since there is no force to hold off, they could, in principle, be epoxied in place. Electrodes (not shown) would be attached to the gold-coated tubes to allow connection of the capacitor to an electronic device (not shown) capable of measuring capacitance. As the dogbone element is strained, the gap between the parallel plates will change, thereby causing the capacitance to change. Therefore, a measurement of the capacitance will be directly related to the Bragg wavelength, provided the temperature of the element is either held constant or measured. Since the tubes are directly connected to the glass element 104, they are completely passive and will not slip. A person skilled in the art would be able to implement without undue experimentation the electronics circuit (not shown) to measure the change in capacitance between the two capacitive plates 108, 112.

FIG. 4: Single Tube Capacitance Sensor Arrangement

FIG. 4 shows a single tube capacitance sensor arrangement generally indicated as 200 that may be used in the tunable optical device 100 shown in FIG. 2. The single tube-in-tube capacitance sensor arrangement 200 is shown in relation to an optical fiber 202 coupled to a compression tuned glass element 204. Similar elements in FIGS. 2–4 are labelled with similar reference numerals with the addition of 100.

The design in FIG. 3 above is simplified as shown in FIG. 4 by elimination of the one tube 110 and extending the remaining tube 206 over the larger diameter of the compression tuned glass element 204.

As shown, the compression tuned glass element 204 has two wider end portion 204a, 204b separated by a narrower intermediate portion 204c. One wider end portion 204a has an inner tube 206 having an inner capacitive plate 208, while another wider end portion 204b has an outer surface with an outer capacitive plate 212.

The single tube capacitance sensor arrangement 200 greatly eases manufacturing and can eliminate alignment issues with other designs. One complication with the delta area based capacitive sensor could be the limited area change of the sensor and, therefore, a restriction of the resolution of the measurement.

FIG. 5: Multiple Tube-in-Tube

Capacitance Sensor Arrangement

FIG. 5 shows a multiple tube-in-tube capacitance sensor arrangement generally indicated as 300 that may be used in the tunable optical device 100 shown in FIG. 2. The multiple tube-in-tube capacitance sensor arrangement 300 is shown in relation to an optical fiber 302 coupled to a compression tuned glass element 304. Similar elements in FIGS. 3–5 are labelled with similar reference numerals with the addition of 100. The tunable optical device 300 has multiple tubes that could be interleaved to increase the effective area change as the compression element is compressed.

As shown, the compression tuned glass element 304 has two wider end portions 304a, 304b separated a narrower intermediate portion 304c. One wider end portion 304a has tubes 306a, 306b having capacitive plates 308a, 308b, 308c, while another wider end portion 104b has tubes 310a, 310b with capacitive plates 312a, 312b, 312c.

FIG. 6: Tube-in-Tube Capacitance

Differential Sensor Arrangement

FIG. 6 shows a tube-in-tube capacitance differential sensor arrangement generally indicated as 400 that may be used in the tunable optical device 100 shown in FIG. 2. The tube-in-tube capacitance differential sensor arrangement 400 is shown in relation to an optical fiber 402 coupled to a compression tuned glass element 404. Similar elements in FIGS. 3–6 are labelled with similar reference numerals with the addition of 100.

The tube-in-tube capacitance differential sensor arrangement 400 is formed as a differential sensor, so one capacitive section would decrease in value while another capacitive section increases providing a differential measurement which can provide increased resolution.

As shown, the compression tuned glass element 404 has two wider end portions 404a, 404b separated a narrower intermediate portion 404c. One wider end portion 404a has an inner tube 406 having capacitive plates 408a, 408b, while another wider end portion 404b has an outer tube 412 with capacitive plates 412a, 412b. In operation, one capacitance value will decrease with compression, while the other capacitance value will increase with pressure. For example, as shown, if a compression force is applied, then the capacitance between plates 408a, 412a decreases (less overlapping plate area), while the capacitance between plates 408b, 412b increases (more overlapping plate area), and vice versa, when the compression force is relaxed.

A person skilled in the art would be able to implement without undue experimentation a differential electronics circuit (not shown) to measure the change in capacitance between the capacitive plates 408a, 412a, or 408b, 412b.

FIG. 7

Figure 7:
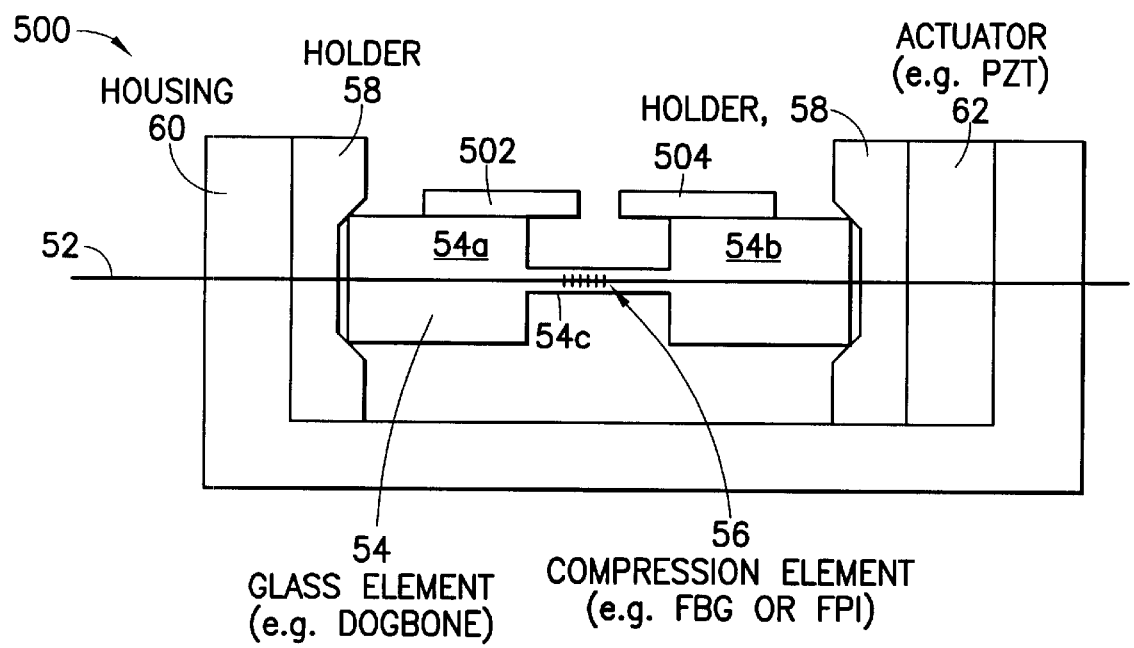
FIG. 7 is a diagram of another sensor arrangement for the tunable optical device shown in FIG. 1.

FIG. 7 shows a part of a tunable optical device generally indicated 500 having a capacitance sensor arrangement with capacitive elements 502, 504, which may be plates or rods, as shown. Similar elements in FIGS. 2 and 7 are labelled with similar reference numerals.

The displacement sensor 24 (FIG. 1) or the displacement circuit 70 (FIG. 2) is not shown but would be connected to the capacitive elements 502, 504.

FIG. 8

Figure 8:
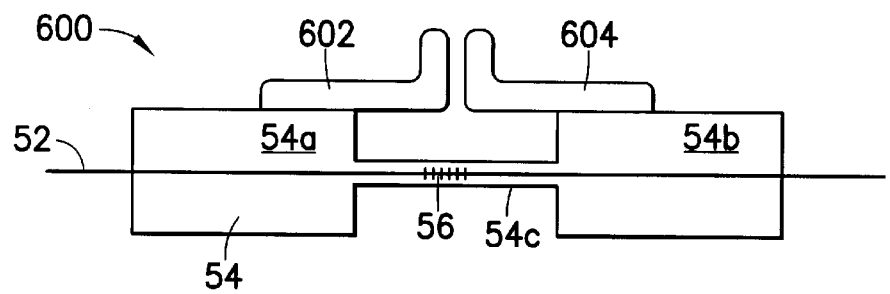
FIG. 8 is a diagram of another sensor arrangement for the tunable optical device shown in FIG. 1.

FIG. 8 shows a capacitance sensor arrangement generally indicated 600 having capacitive elements 602, 604, which may be L-shaped plates or rods, as shown. Similar elements in FIGS. 2 and 7–8 are labelled with similar reference numerals.

The displacement sensor 24 (FIG. 1) or the displacement circuit 70 (FIG. 2) is not shown but would be connected to the L-shaped capacitive elements 602, 604.

Figure 9:
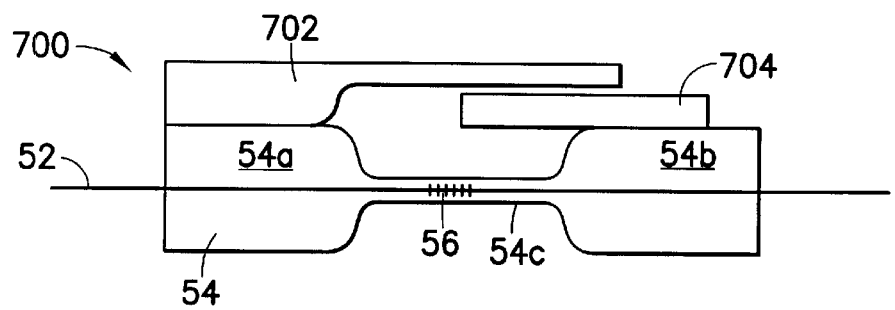
FIG. 9 is a diagram of another sensor arrangement for the tunable optical device shown in FIG. 1.
Figure 9A:
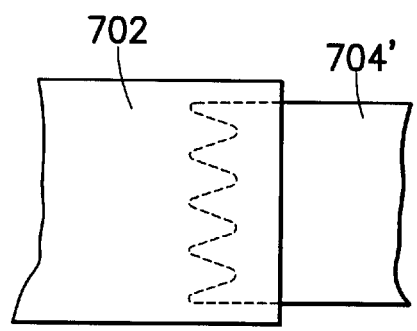
FIG. 9A is a diagram of another sensor arrangement for the tunable optical device shown in FIG. 9.

FIGS. 9 and 9A

FIG. 9 shows a capacitance sensor arrangement generally indicated as 700 with overlapping capacitive elements 702, 704, which may be rods and plates, as shown. Similar elements in FIGS. 2 and 7–9 are labelled with similar reference numerals. FIG. 9A shows an alternative embodiment wherein one of the overlapping capacitive elements 704' has a sawtooth shape.

The displacement sensor 24 (FIG. 1) or the displacement circuit 70 (FIG. 2) is not shown but would be connected to the capacitive elements 702, 704.

FIG. 10

Figure 10:
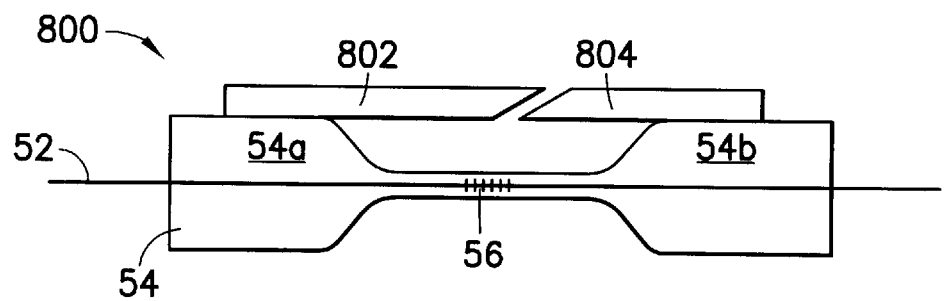
FIG. 10 is a diagram of one sensor arrangement for the tunable optical device shown in FIG. 1.

FIG. 10 shows a capacitance sensor arrangement generally indicated as 800 with overlapping capacitive elements 802, 804, which may be plates or rods having corresponding angled capacitive surfaces, as shown. Similar elements in FIGS. 2 and 7–10 are labelled with similar reference numerals.

The displacement sensor 24 (FIG. 1) or the displacement circuit 70 (FIG. 2) is not shown but would be connected to the capacitive elements 802, 804.

FIG. 11

Figure 11:
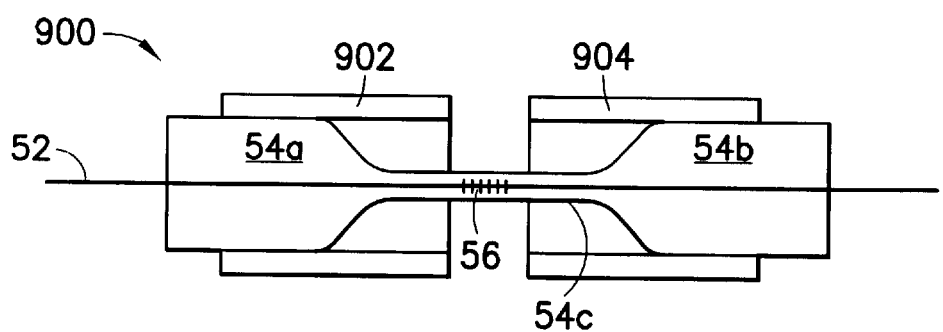
FIG. 11 is a diagram of another sensor arrangement for the tunable optical device shown in FIG. 1.

FIG. 11 shows a capacitance sensor arrangement generally indicated as 900 with capacitive elements 902, 904, which may be tubes having corresponding surfaces, as shown. Similar elements in FIGS. 2 and 7–11 are labelled with similar reference numerals.

The scope of the invention is not intended to be limited to any particular variable capacitor configuration or shape thereof.

The displacement sensor 24 (FIG. 1) or the displacement circuit 70 (FIG. 2) is not shown but would be connected to the capacitive elements 902, 904.

FIG. 12

Figure 12:
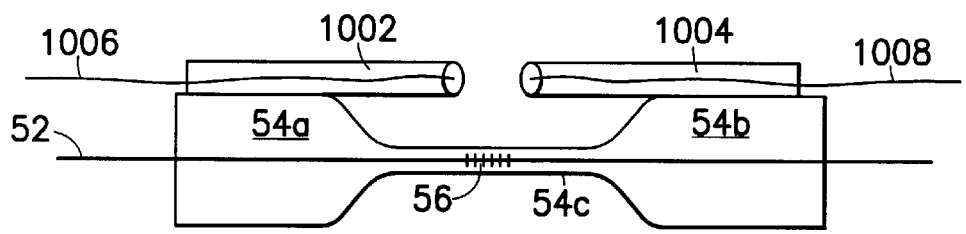
FIG. 12 is a diagram of another sensor arrangement for the tunable optical device shown in FIG. 1.

FIG. 12 shows a capacitance sensor arrangement generally indicated as 1000 with capacitive elements 1002, 1004, which may be tubes having corresponding wires 1006, 1008 connected to capacitive surfaces, as shown. Similar elements in FIGS. 2 and 7–12 are labelled with similar reference numerals.

The displacement sensor 24 (FIG. 1) or the displacement circuit 70 (FIG. 2) is not shown but would be connected to the capacitive elements 1002, 1004.

FIG. 13

Figure 13:
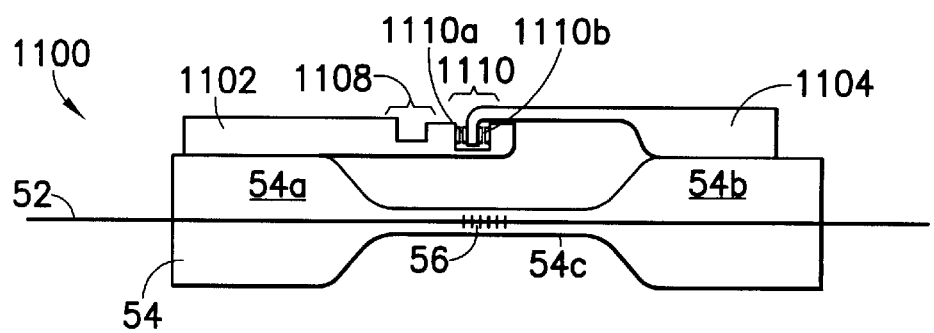
FIG. 13 is a diagram of another sensor arrangement for the tunable optical device shown in FIG. 1.

FIG. 13 shows a differential capacitance sensor arrangement generally indicated as 1100 with capacitive elements 1102, 1104, which may be overlapping rods, tubes or plates, as shown. The differential capacitance sensor 1100 may also include a reference capacitor 1108 and a variable capacitor 1110. The reference capacitor 1108 does not vary and allows a compensation for temperature, while the variable capacitor 1110 does vary in relation to the values of the two different capacitors generally indicated as 1110a, 1110b. Similar elements in FIGS. 2 and 7–13 are labelled with similar reference numerals.

The displacement sensor 24 (FIG. 1) or the displacement circuit 70 (FIG. 2) is not shown but would be connected to the reference capacitor 1108 and the variable capacitor 1110.

FIG. 14

Figure 14:
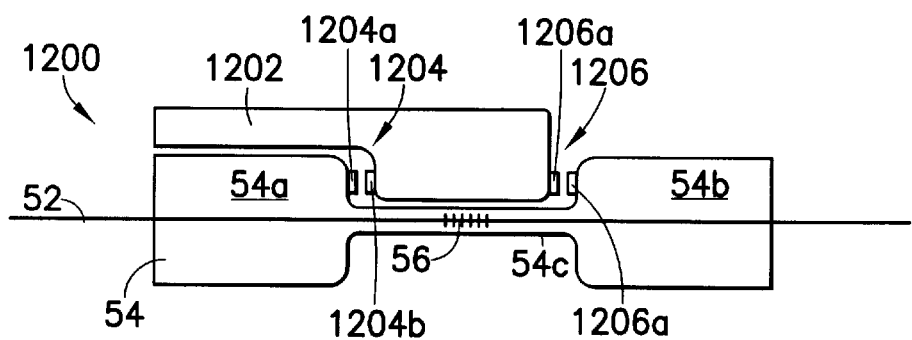
FIG. 14 is a diagram of another sensor arrangement for the tunable optical device shown in FIG. 1.

FIG. 14 shows a differential capacitance sensor arrangement generally indicated as 1200 with a capacitive element 1202, which includes two variable differential capacitors 1204, 1206, as shown. One variable differential capacitor 1204 has plates 1204a, 1204b respectively affixed on a surface of one wide portion 54a of the glass element 54 and on the surface of the capacitive element 1202. The other variable differential capacitor 1206 has plates 1206a, 1206b respectively affixed on a surface of the other wide portion 54b of the glass element 54 and on the surface of the capacitive element 1202. Similar elements in FIGS. 2 and 7–13 are labelled with similar reference numerals.

The displacement sensor 24 (FIG. 1) or the displacement circuit 70 (FIG. 2) is not shown but would be connected to the differential capacitors 1204, 1206.

FIG. 15

Figure 15:
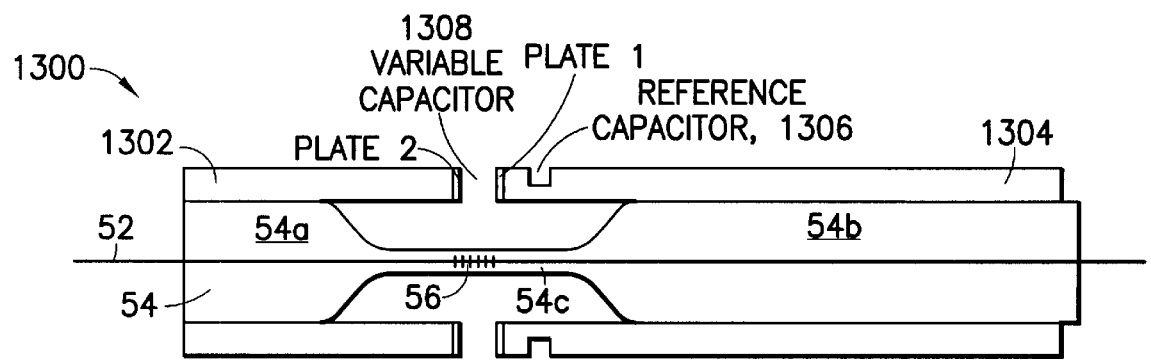
FIG. 15 is a diagram of another sensor arrangement for the tunable optical device shown in FIG. 1.

FIG. 15 shows a differential capacitance sensor arrangement generally indicated as 1300 with capacitive elements 1302, 1304, which may be overlapping rods, tubes or plates, as shown. The differential capacitance sensor 1100 includes a reference capacitor 1306 and a variable capacitor 1310 having a plate 1 and a plate 2, as shown. Similar elements in FIGS. 2 and 7–15 are labelled with similar reference numerals.

Figure 16A:
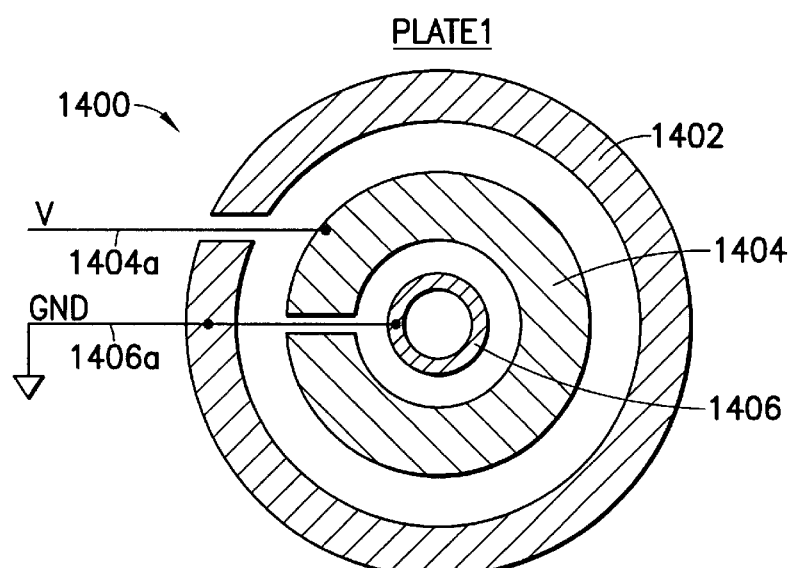
FIG. 16A a diagram of a first plate for sensor arrangements for the tunable optical device shown in FIG. 2.
Figure 16B:
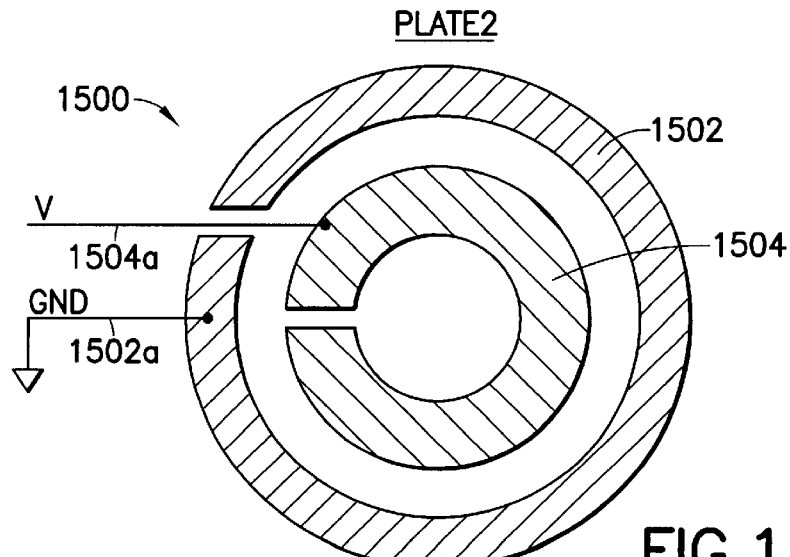
FIG. 16B is a diagram of a second plate for sensor arrangements for the tunable optical device shown in FIG. 2.

The displacement sensor 24 (FIG. 1) or the displacement circuit 70 (FIG. 2) is not shown but would be connected to the reference capacitor 1306 and the variable capacitor 1308. FIGS. 16A, 16B

FIG. 16A shows an example of a first capacitive plate generally indicated as 1400 that can be used with one or more of the capacitive plates shown in FIGS. 1–15. The first capacitive plate will cooperate with a second capacitive plate 1500 shown in FIG. 16B to reduce noise and voltage from electromagnetic interference (EMI) between the two ground of the capacitive plates.

The first capacitive plate 1400 includes an outer ring 1402, an intermediate ring 1404 and an inner ring 1406. As shown, the intermediate ring 1404 is connected via a line 1404a to a voltage source (not shown) and the outer ring 1402 and the inner ring 1406 are connected via a line 1406a to a ground source (not shown).

The second capacitive plate 1500 includes an outer ring 1502 and an intermediate ring 1504. As shown, the intermediate ring 1504 is connected via a line 1504a to a voltage source (not shown) and the outer ring 1402 is connected via a line 1406a to a ground source (not shown).

The voltage line 1404a and 1504a, and the ground lines 1406a and 1502a may be connected via lines 72a, 74a shown in FIG. 2 to the displacement sensor circuit 70.

In operation, the combined capacitive plates 1400, 1500 reduce edge affects and act as a shield with respect to coupling of stray interference.

Scope of the Invention

Although the invention has been described with respect to using a capacitor to measure the gap distance, it should be understood by those skilled in the art that other gap sensing techniques may be used, such an inductive, optical, magnetic, microwave, time-of-flight based gap sensors. Moreover, the scope of the invention is also intended to include measuring or sensing a force applied on or about the compressive element, and feeding it back to control the compression tuning of the optical structure.

Although the invention has been described and illustrated with respect to exemplary embodiments thereof, the foregoing and various other additions and omissions may be made therein and thereto without departing from the spirit and scope of the present invention.

We claim:

1. A tunable optical device comprising:
   a compression tuned optical structure, responsive to an optical signal, and further responsive to a displacement sensor signal, for providing a compression tuned optical structure signal containing information about a change in an optical characteristic of the compression tuned optical structure, and for further providing an excitation caused by a change in a displacement of the compression tuned optical structure; and
   a displacement sensor, responsive to the excitation, for providing the displacement sensor signal containing information about the change in the displacement of the compression tuned optical structure.

2. A tunable optical device according to claim 1, wherein the displacement sensor includes a capacitance sensor coupled to the compression tuned optical structure for measuring a change in capacitance that depends on a change in displacement.

3. A tunable optical device according to claim 1, wherein the capacitance sensor includes two parallel and opposing plates and the change in capacitance depends on a change in a gap or an area with respect to the two parallel and opposing plates.

4. A tunable optical device according to claim 2, wherein the change in the displacement of the compression tuned optical structure causes a change in the gap between the two parallel and opposing plates, and the change in capacitance depends on the change in the gap.

5. A tunable optical device according to claim 2, wherein the change in the displacement of the compression tuned optical structure causes a change in an overlapping area between the two parallel and opposing plates, and the change in capacitance depends on the change in the overlapping area.

6. A tunable optical device according to claim 1, wherein the compression tuned optical structure has a capacitance sensor having two metallic-coated tubes affixed to the compression tuned optical structure so that metallic surfaces face each other with a small gap inbetween.

7. A tunable optical device according to claim 6, wherein the small gap is about 200 micron.

8. A tunable optical device according to claim 4,
   wherein the compression tuned optical structure is a dogbone structure having wider end portions separated by a narrower intermediate portion; and
   wherein each of the two metallic-coated tubes is affixed to or formed on a respective one of the wider end portions.

9. A tunable optical device according to claim 4, wherein the capacitance sensor has electrodes attached to the metallic-coated tubes to allow connection of the capacitor sensor to a displacement sensor circuit capable of measuring capacitance.

10. A tunable optical device according to claim 8, wherein the narrower intermediate portion has a fiber Bragg grating arranged therein.

11. A tunable optical device according to claim 4, wherein the narrower intermediate portion has a Fabry-Perot interferometer arranged therein.

12. A tunable optical device according to claim 1, wherein the displacement sensor includes a tube-in-tube capacitance sensor arrangement.

13. A tunable optical device according to claim 12, wherein the tube-in-tube capacitance sensor arrangement includes an inner tube with an inner capacitive plate and an outer tube with an outer capacitive plate.

14. A tunable optical device according to claim 1, wherein the displacement sensor includes a single tube capacitance sensor arrangement.

15. A tunable optical device according to claim 14, wherein the single tube capacitance sensor arrangement includes a tube with a first capacitive plate for capacitively cooperating with a second capacitive plate arranged on a surface of the compression tuned optical structure.

16. A tunable optical device according to claim 1, wherein the displacement sensor includes multiple tube-in-tube capacitance sensor arrangement.

17. A tunable optical device according to claim 16, wherein the multiple tube-in-tube capacitance sensor arrangement includes multiple inner tubes with respective inner capacitive plates and multiple outer tubes with multiple outer capacitive plates.

18. A tunable optical device according to claim 1, wherein the displacement sensor includes a differential capacitance sensor arrangement.

19. A tunable optical device according to claim 1, wherein the differential capacitance sensor arrangement include a first variable capacitor and a second variable capacitor.

20. A tunable optical device comprising:
a compression tuned optical structure, responsive to an optical signal, and further responsive to a sensor signal, for providing a compression tuned optical structure signal containing information about a change in an optical characteristic of the compression tuned optical structure, and for further providing an excitation caused by a change in a physical parameter in relation to the compression tuned optical structure; and
a sensor, responsive to the excitation, for providing the sensor signal containing information about the change in the physical parameter in relation to the compression tuned optical structure.

21. A tunable optical device according to claim 20, wherein the sensor senses a displacement in relation to the compression tuned optical structure.

22. A method for tuning a wavelength of a grating comprising the steps of:
obtaining a compression tunable element having a Bragg grating therein, the compression tunable element having a capacitor across the Bragg grating, the capactitor having plates and a gap inbetween that is related to the wavelength of the grating;
measuring a capacitance value of the capacitor; and
compressing the compression tunable element to set a desired grating wavelength based on the capacitive value.

* * * * *

UNITED STATES PATENT AND TRADEMARK OFFICE
CERTIFICATE OF CORRECTION

PATENT NO.    : 6,310,990 B1
DATED         : October 30, 2001
INVENTOR(S)   : Putnam et al.

It is certified that error appears in the above-identified patent and that said Letters Patent is hereby corrected as shown below:

Title page,
Item [56], under References Cited, U.S. PATENT DOCUMENTS, please delete "11/98 Mizrahi" and insert -- 11/99 Mizrahi --;

Column 4,
Line 25, after "Figure 4" insert -- is --;
Line 27, delete "deice" and insert -- device --.

Signed and Sealed this

Thirtieth Day of July, 2002

Attest:

JAMES E. ROGAN
Attesting Officer        Director of the United States Patent and Trademark Office